March 20, 1928.
J. T. LANDAICHE
1,663,409
CANE STRIPPING AND TOPPING MACHINE
Filed Feb. 24, 1927
9 Sheets-Sheet 2
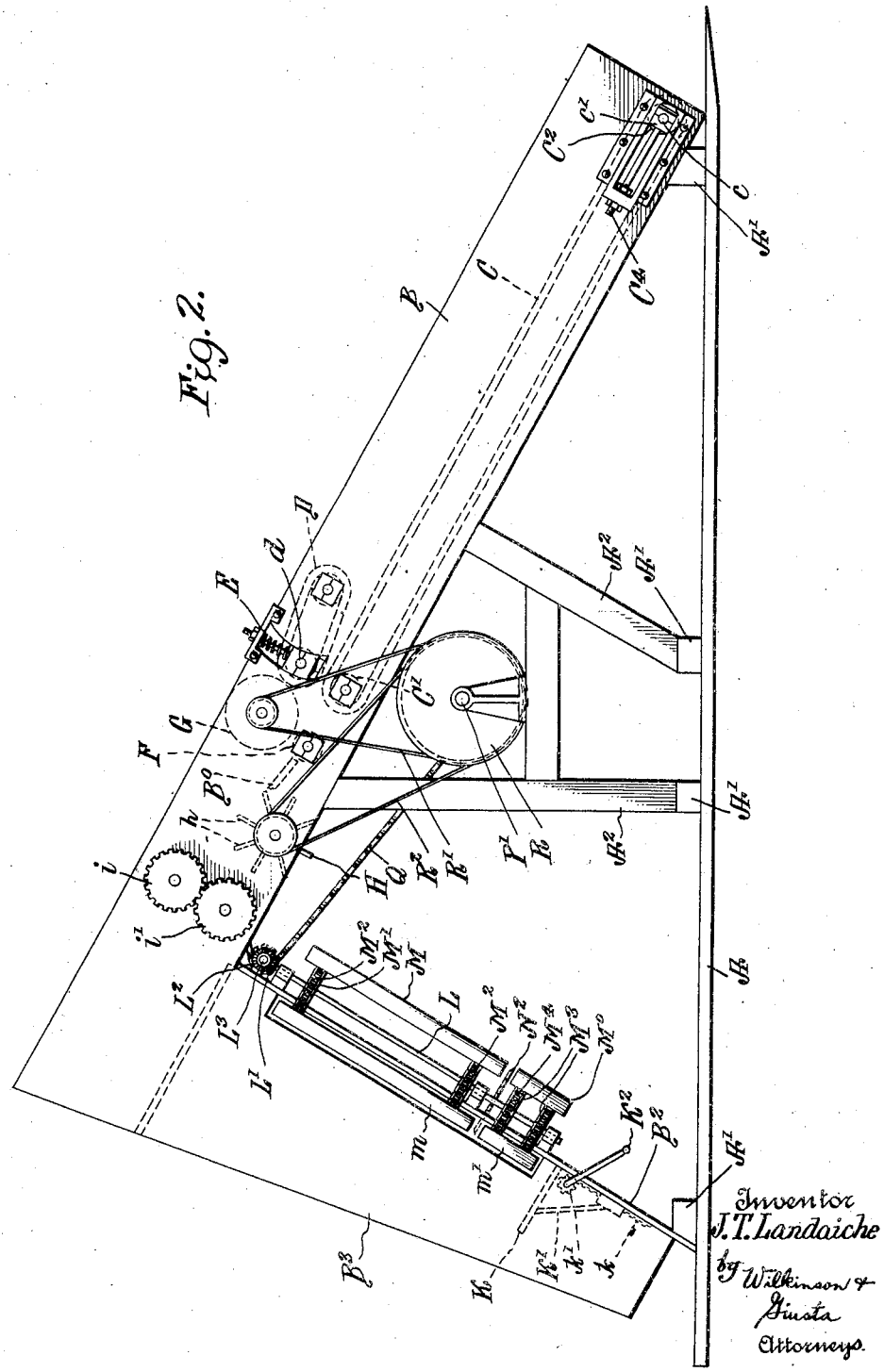

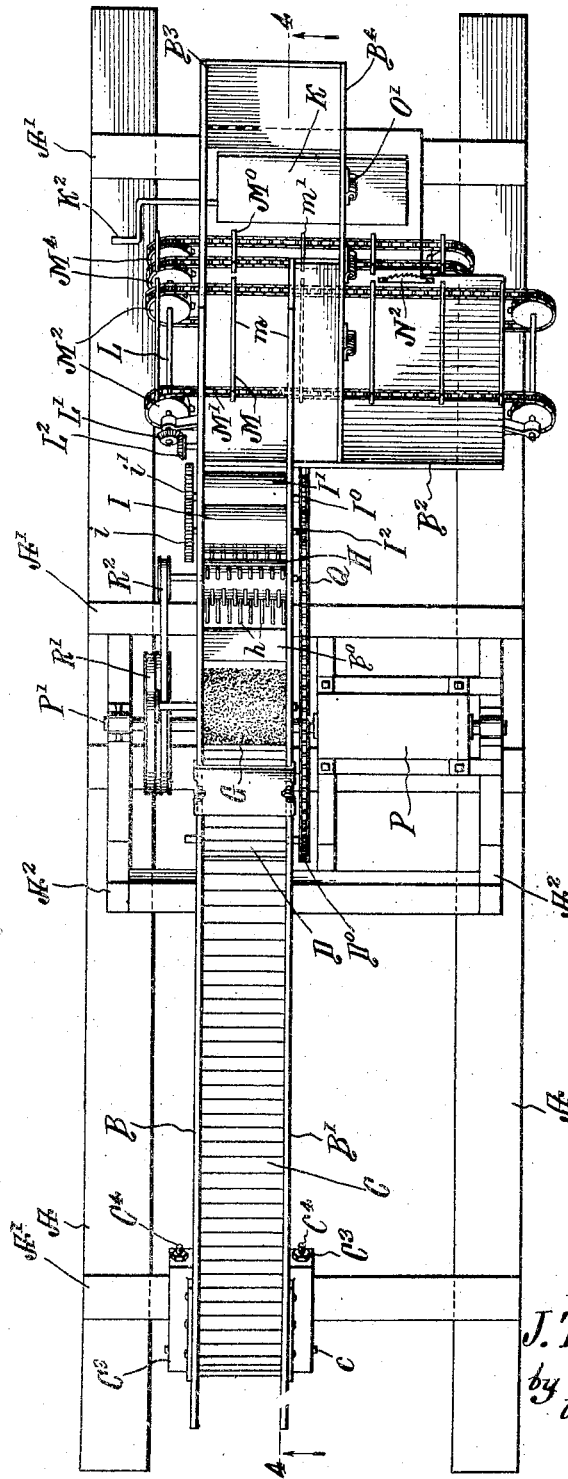

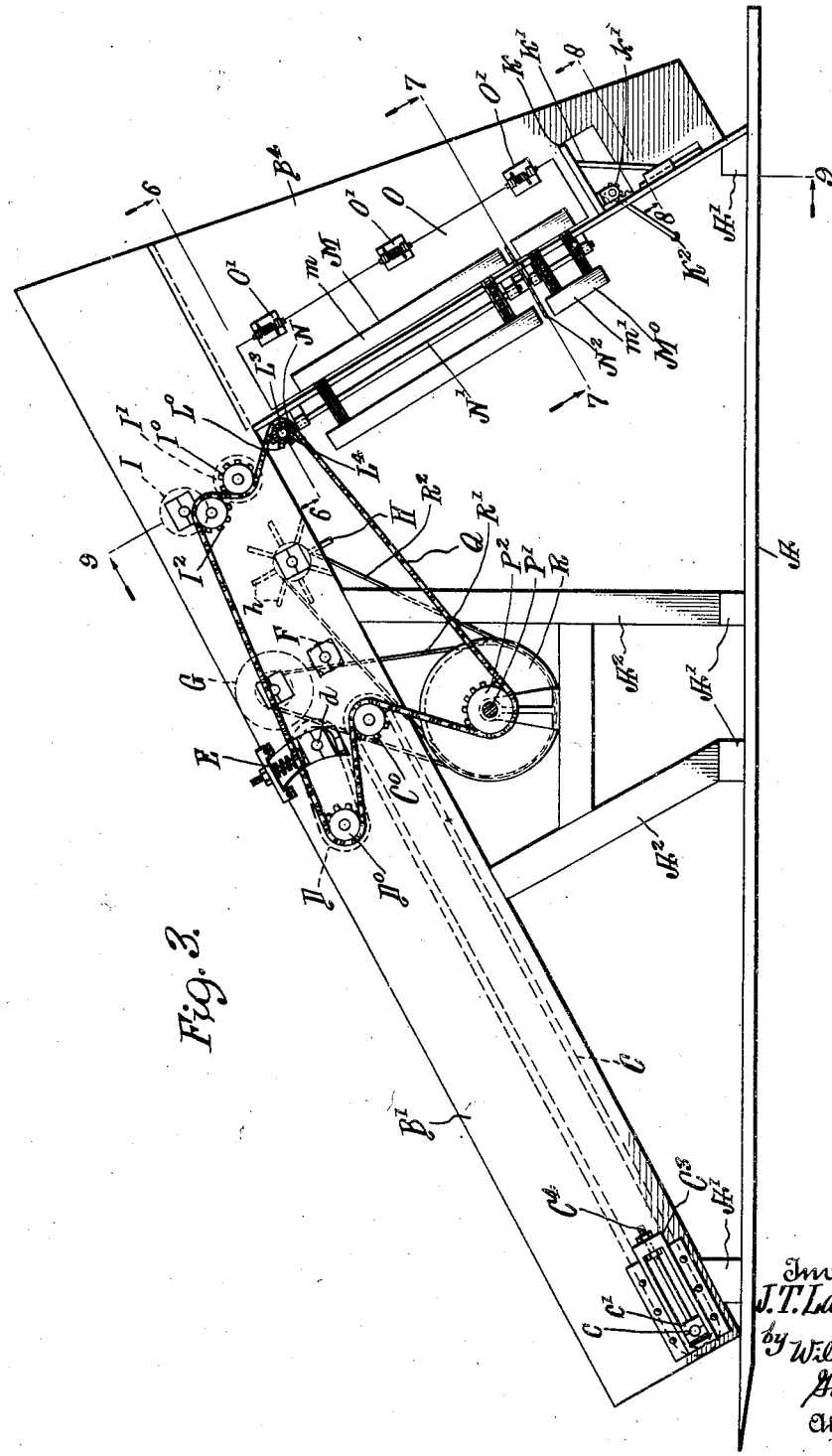

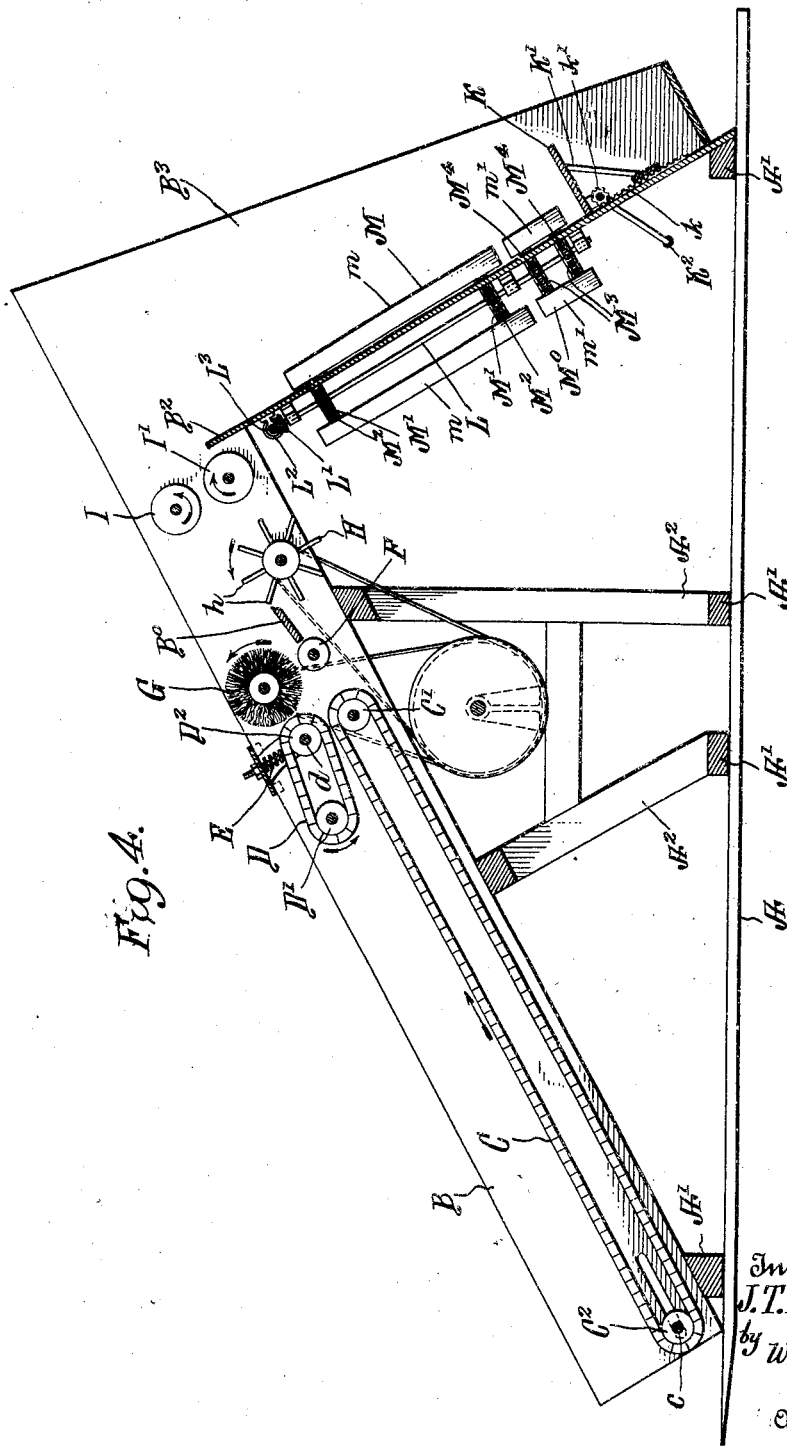

March 20, 1928.
J. T. LANDAICHE
1,663,409
CANE STRIPPING AND TOPPING MACHINE
Filed Feb. 24, 1927
9 Sheets-Sheet 5
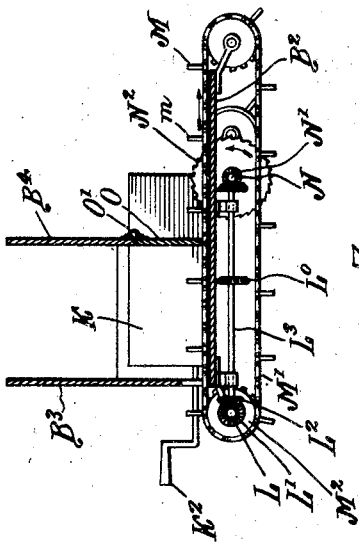
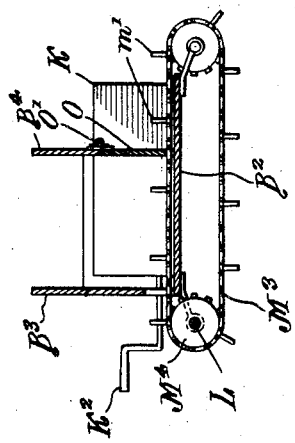
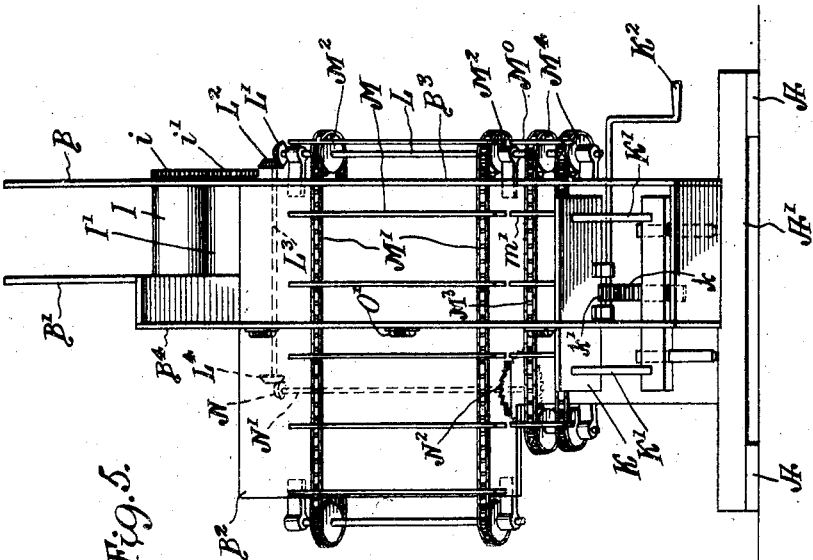
Inventor
J. T. Landaiche
by Wilkinson & Giusta
Attorneys.

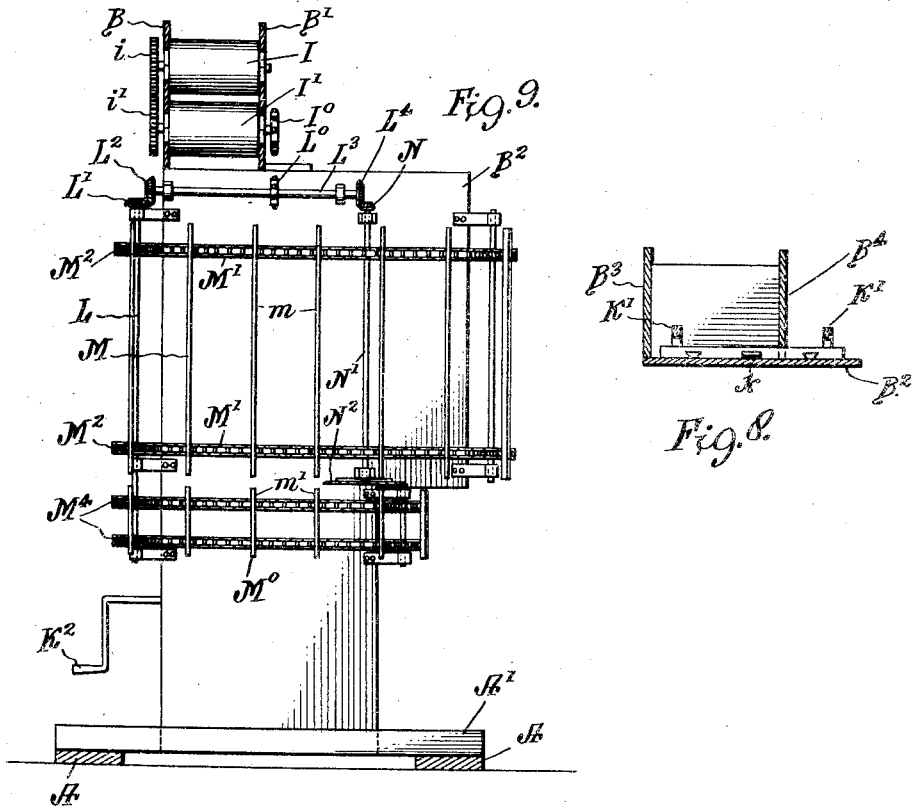
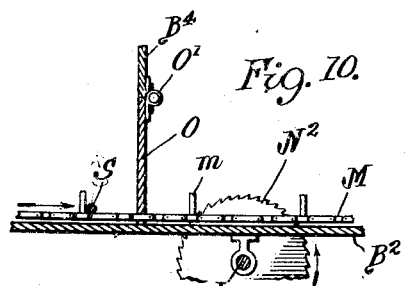
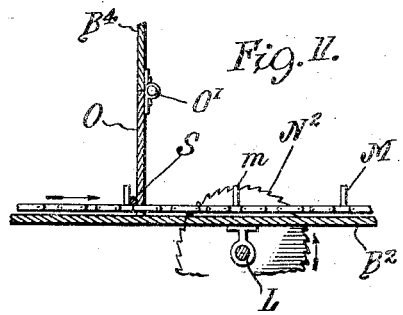
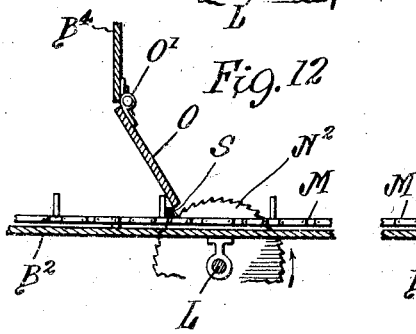
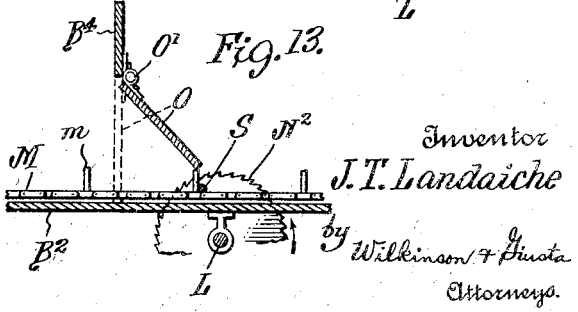

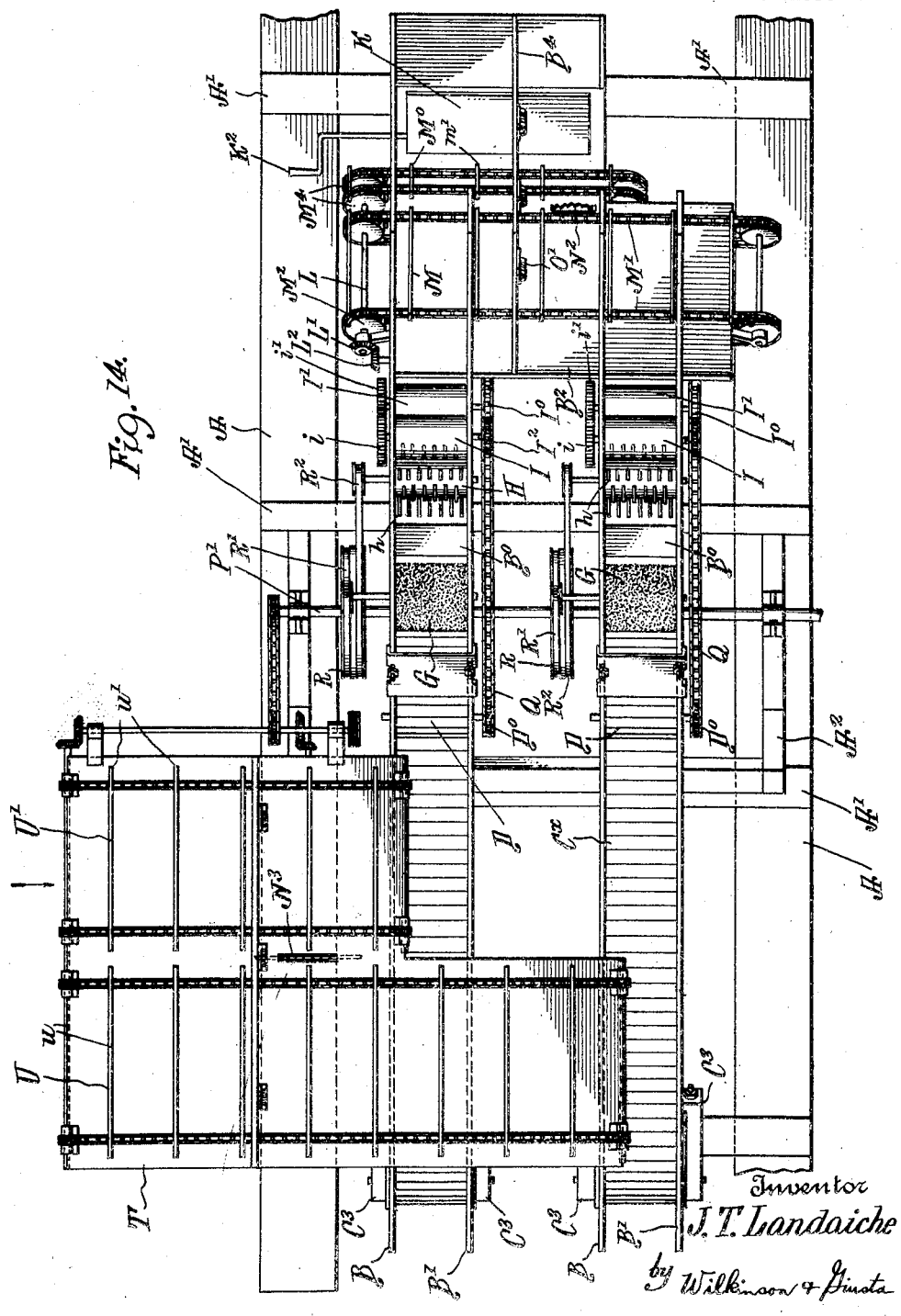

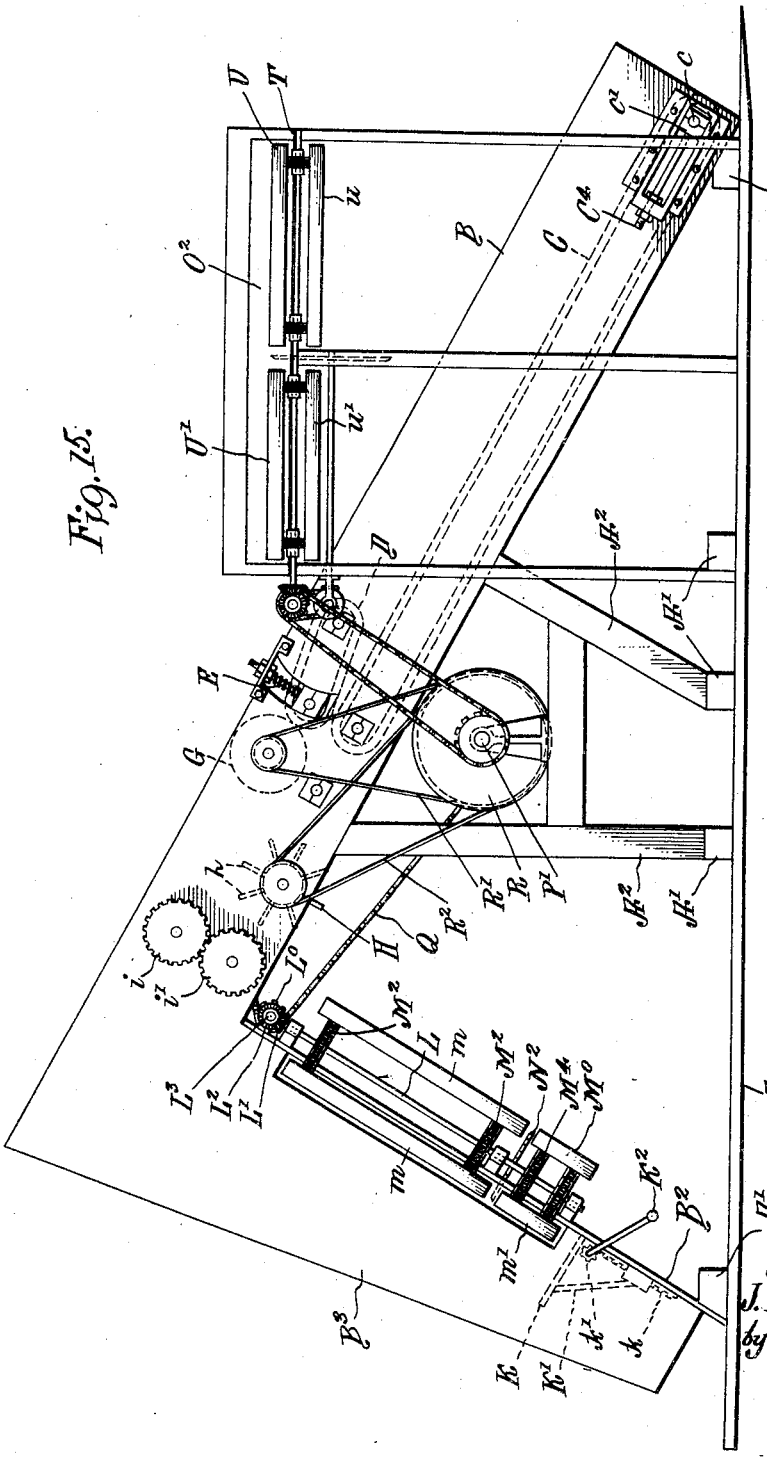

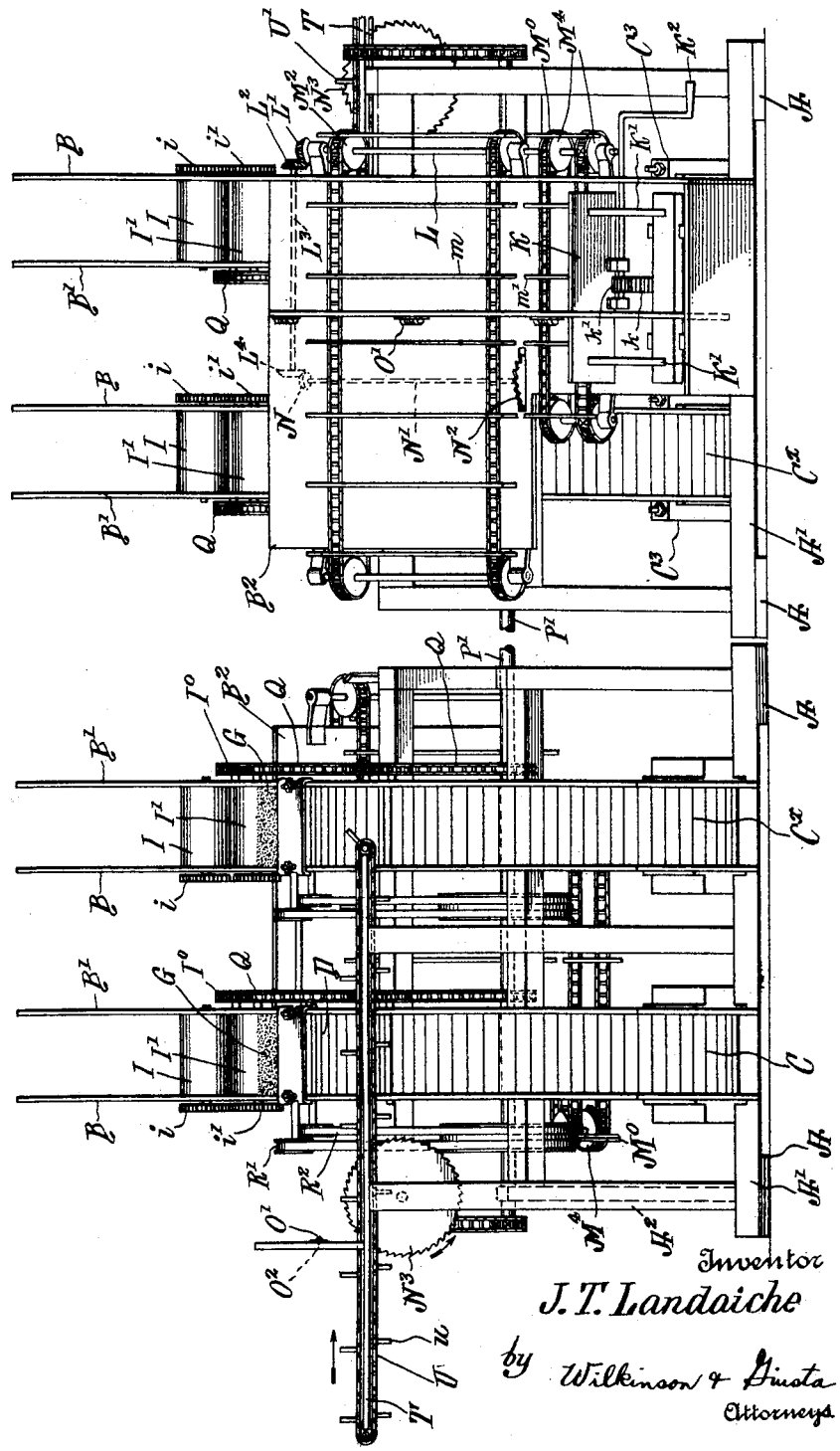

Patented Mar. 20, 1928.

1,663,409

UNITED STATES PATENT OFFICE.

JOSEPH THOMAS LANDAICHE, OF THIBODAUX, LOUISIANA.

CANE STRIPPING AND TOPPING MACHINE.

Application filed February 24, 1927. Serial No. 170,620.

My present invention relates to apparatus for removing the dead and green leaves, and any mud or other solid matter adhering to the cane stalks from the cane, after it has been cut and before it is delivered to the crusher or mill to be ground; and it also consists in means for severing the green ends of the stalks from the sweeter or riper portions of the stalks before the stalks go to the crusher or mill.

In harvesting cane, there are generally a number of dead dried leaves, which frequently stick close to the stalk and are with difficulty removed therefrom in the ordinary method of cutting and stripping by hand, and these dried leaves, when they pass through the crusher and mill are apt to absorb and carry off part of the sweet juice, with the resultant lack of efficiency in the mill, and furthermore, these dried leaves are apt to carry along with them mud or dust or other solid matter, which tends to discolor the juice and otherwise impair the clarification or defecation of the juice extracted from the cane.

Furthermore, in harvesting the cane, the upper end of the stalk usually carries tufts of long green leaves, and these are ordinarily cut off with the green upper end of the stalk before the stalks are loaded on the car or wagon for transportation to the mill.

According to my present invention, these dried and green leaves are stripped from the cane stalks and the stalks themselves are brushed clear of mud or other solid matter, and then the stripped green portion of the stalk is cut off at the desired point from the tip of the stalk, so that only the sweeter portions of the stalk are carried to the mill, while the greener portions of the stalk so eliminated may be gathered together for use as stock feed or for other purposes.

My invention comprises means for stripping the leaves and other solid matter from the stalk; and then topping the stalk as before described, with the use of rotary saws; and also in means for holding the stalks firmly in place during the cutting operation.

Since the stalks of cane are often quite crooked, especially where the cane has been blown down and has bent upwards again, I also provide means whereby the stalks may be cut into comparatively straight lengths, and in which the upper portions of the stalk which are not so apt to be crooked as the lower, are more conveniently operated upon in the manner ordinarily practicable with straight stalks.

The invention comprises a portable apparatus, which may be mounted upon wheels, skids, caterpillar tractors or any other convenient transporting means. Such means not being necessarily a part of my invention and their use being optional, I have shown the form of support diagrammatically, that is, in the form of skids, which may be drawn along the ground or mounted upon wheels, as desired.

My invention will be more fully understood after reference to the accompanying drawings, in which like parts are indicated by similar reference symbols throughout the several views, and in which:

Figure 1 is a plan view showing the apparatus in the simplest form, that is, without the addition of the means for taking care of crooked cane;

Figure 2 is a side elevation of the device shown in Fig. 1, as seen from the upper side of said figure;

Figure 3 is a side elevation as seen from the opposite side of Fig. 1 from that shown in Fig. 2;

Figure 4 shows a central vertical section along the line 4—4 of Fig. 1, and looking in the direction of the arrows;

Figure 5 is a rear view of the apparatus shown in Fig. 1 as seen from the right of said figure;

Figure 6 shows a transverse section along the line 6—6 of Fig. 3 and looking in the direction of the arrows;

Figure 7 is another transverse section along the line 7—7 of Fig. 3, and looking in the direction of the arrows;

Figure 8 shows a transverse section along the line 8—8 of Figure 3, and looking in the direction of the arrows;

Figure 9 shows a section along the line 9—9 of Figure 3 and looking in the direction of the arrows;

Figures 10 to 13 are fragmentary sectional views showing the arrangement of the saws and the swinging doors for holding the cane stalks against the saws during the cutting operation.

Figure 14 shows a plan view of the apparatus already shown, with the further addition of means for cutting the stalk in two pieces, which would be desirable in treating crooked cane. In this construction, there are separate conveyors for the two portions of cut stalk;

Figure 15 is a side view of the device shown in Fig. 14, as seen from the upper side of said figure;

Figure 16 is a front elevation of the construction shown in Fig. 14, as seen from the left of said figure; and Figure 17 is a rear elevation of the construction shown in Fig. 14, as seen from the right of said figure.

Referring first to the construction shown in Figs. 1 to 13, inclusive, A represents longitudinal beams shown in the form of skids connected by crossbars A', the whole forming a base-frame or platform, on which the operative parts of the machine are mounted. Vertical supporting frames $A^2$ may be connected to the base-frame in any convenient way, for supporting the parts carried thereby. As before stated, this base-frame may be mounted on wheels or caterpillar tractors, and I do not mean to limit the invention to the details of this base-frame but only to the parts mounted thereon.

B and B' represent the side walls of a conveyor trough, the bottom of which is formed by the endless conveyor belt C, which conveyor belt passes over the driven drum C' and the idler drum $C^2$, which latter is mounted on a shaft $c$, and said shaft is under tension by the tensioning device $C^3$, shown in Figs. 1, 2, and 3. This tensioning device comprises an adjusting screw $C^4$, which presses outwards on the bearing $c'$, of the shaft $c$, and thus keeps the conveyor belt C under the desired tension. This conveyor belt is driven in the direction of the arrows, as will be hereinafter described.

Above the conveyor belt C is a feeding arrangement comprising a short conveyor D passing over the driven drum D' and the idler drum $D^2$, and the latter drum is normally pressed downward by the springs E, which act on the ends of the shaft $d$ of the drum $D^2$ and tend to effect a gripping arrangement between the conveyor C and the short conveyor D, whereby the cane is gripped, as will be hereinafter described.

These springs will permit the upper conveyor belt to yield, as the feed of cane between the two conveyors increases, as will be hereinafter more fully described.

Beyond the drums C' and $D^2$ I provide an idler roller F, which serves as a feed roller and above which is a brush G, which rotates in the direction of the arrow, see Fig. 4. This is a cylindrical wire brush and serves not only to clean the cane but also as a feed roller.

Beyond the roller F is a transverse strip $B^0$, which serves to guide the cane to the beater H. This beater rotates in the direction of the arrow, see Fig. 4, and carries on its surface a series of staggered fingers $h$, which may be made of rawhide, walrus hide or other durable flexible material.

Beyond the beater H are the feed rollers I and I', which are driven in the direction of the arrows, as shown in Fig. 4, and between these the stripped cane stalks are fed over the transverse partition $B^2$ of the framework, which is inclined sharply downwards, as shown in Fig. 4, and with the side walls $B^3$ and $B^4$, forms a chute for the stripped cane stalks.

Towards the bottom of this chute I provide a shelf K, which is vertically adjustable by means of the rack $k$ and pinion $k'$ to the desired height, so that the stalks may be cut off the desired distance from the green end, as will be hereinafter described.

This shelf or table K is braced in any convenient way, as by the braces K', which move up and down with the shelf under the action of the rack and pinion arrangement, the pinion being actuated by the hand crank $K^2$, as shown most clearly in Figs. 4 and 5.

Travelling across the partition $B^2$ is a slatted conveyor M, see Figs. 1, 4, 5, and 6. This conveyor is provided with a series of slats $m$ spaced apart and carried by the conveyor chains M', which are driven by the sprocket wheels $M^2$ on the shaft L. Below this conveyor M is a similar conveyor $M^0$, having shorter slats $m'$, which shorter slats are spaced apart to register with the long slats $m$ of the upper conveyor, and these shorter slats $m'$ are propelled by the sprocket chains $M^3$ on the sprocket wheels $M^4$, also carried by the shaft L. This shaft L is driven by the bevel gears L' and $L^2$, as will be hereinafter more fully described. The bevel gear $L^2$ is mounted on the driven shaft $L^3$ and carries a bevel gear $L^4$, which meshes with the bevel gear N on the shaft N' carrying the rotary saw $N^2$.

The side wall $B^4$ is extended forwards parallel with the side wall B of the conveyor trough, as shown in Fig. 1, and is provided with a downwardly depending door O, shown most clearly in Fig. 3, which is normally pressed downwards to the closed position, as by the spring hinges O', see Fig. 3. This door yields, to permit the cane to pass in one direction, but holds the cane stalks against the saw in the cutting operation, as will be hereinafter more fully described.

It will be noted from Fig. 5 that the slatted conveyor M is longer than the slatted conveyor $M^0$, for the reason that it is desired to separate the short severed portions of the stalk from the longer, as will be hereinafter more fully described.

The several moving parts hereinbefore described are driven in any convenient way, as from the internal combustion engine P driving a shaft P', which carries on one side of the apparatus a sprocket P², see Fig. 3, which drives a sprocket chain Q passing over the various sprocket wheels C⁰, D⁰, the idler I², the sprocket I⁰ and the sprocket L⁰, whereby the single sprocket chain will drive both the conveyors C and D, the feed rollers I and I' and the two conveyors M and M⁰ and the saw N², the parts being so arranged that these various devices will be driven at the desired speed.

In order to secure the proper direction of rotation of the two feed rollers I and I', their shafts carry respectively the gears $i$ and $i'$, shown at the left of Fig. 2.

On the opposite side of the apparatus from the sprocket P², the main shaft P' is extended, as shown in Figs. 1 and 2, and carries a large pulley R, driving the belts R' and R², driving respectively at a high rate of speed the brush G and the beater H.

The operation of the apparatus, as thus described in detail, is as follows:

The apparatus is transported to the proper place in the field, where the cut cane can be conveniently brought to it. We will assume that the cane has been cut at about the surface of the ground in the field in the usual way, as by hand, and is brought to the apparatus herein described, with the dead leaves or trash and green leaves at the top still adhering thereto, as well as with any mud or dust or other foreign matter that may be deposited on the cut stalks in the field or in transit.

These stalks so cut are placed on the conveyor C with their tops carrying the green leaves upwards, that is, directed towards the short conveyor D. As these green tops reach the short conveyor D, they are gripped between the conveyors D and C, under pressure of the springs E. This gripping effect will automatically adjust itself, according to the thickness of the feed of the cane on the conveyor C.

The stalks so gripped are fed top first to the brush G and the feed roller F, and this rapidly rotating brush G tears the larger portion of the trash from the cane and at the same time cleans off most of the dust or mud or other solid matter that adheres to the stalks; and the cane stalks, continuing their travel, will pass over the beater H, whose thongs $h$ will pass between the stalks and continue the stripping action by tearing off the leaves and knocking off any solid matter that may adhere to the stalks; and the stalks, then completely stripped of leaves and adhering solid matter, will pass between the rollers I and I', and will fall top-foremost over the partition B². The stalks will fall between the slats $m$ of the upper conveyor M and $m'$ of the lower conveyor M⁰, and the green tops will rest on the shelf K, whose distance from the saw N² has been predetermined, so as to determine the length of the green top that is to be separated from the stalk before the stalk goes to the mill. In order to hold the stalks against the saw during the cutting operation, these stalks are fed under the spring pressed door O, which will hold the stalks down between the slats $m$ and $m'$ while the saw is cutting off the green portion of the stalk. After the stalk has been severed, as thus described, the longer portions intended for the mill, are carried by the longer conveyor M, see Fig. 5, to a suitable receptacle, such as a conveyor, cart, car or the like, not shown, whence they may be delivered to the mill. The shorter conveyor M⁰ carries the green tops a shorter distance, where they may be delivered to another receptacle and carried off either for stock feed or for any other purpose, as may be desired. I have not shown either the receptacle for carrying off the long stalks in Fig. 5, or for carrying off the cut-off tops, as any suitable device might be used for this purpose, and it is not deemed necessary to complicate the drawings by illustrating immaterial details, which will be obvious to anyone skilled in the art.

I have shown in section at S in Figs. 10 to 13, a single stalk of cane, merely to illustrate how the apparatus operates, but in practice a large number of stalks can be operated upon at the same time, and it would merely add confusion to the drawings to illustrate these.

Thus, it will be seen that in the operation of my invention, the cut cane bearing the trash, foreign matter, green leaves, and green tops, are fed to the machine, and that the leaves, green or dead, are stripped from the stalks, as also the solid matter adhering thereto, that the predetermined length is cut from the tops of the stalks and that this short length is separated from the longer length, which is intended to be carried to the mill, and thus the operation of cleaning the stalks and cutting off the tops thereof is continuously effected, as long as cane is supplied to the apparatus.

In the foregoing description of my apparatus, the cane stalks are supposed to be supplied whole to the machine, there to be stripped of trash, leaves, and solid matter and to be topped as hereinbefore described, and this operation will be satisfactorily performed on the general run of cane, but in order to provide an attachment for taking care of crooked cane, I provide an arrangement, in which the lower part of the stalk is severed before the stalk reaches the topping stage, and the lower and riper part so cut off is stripped and cleaned and prepared for delivery to the mill, while the upper part of the stalk so severed is subjected to the same treatment as the whole stalks already described in connection with Figs. 1 to 13.

It will be noted that when cane grows most luxuriantly, it is apt to be blown down and that as a rule the crooked canes are the longer canes, while the shorter cane stalks are apt to remain straight or practically so, until they are harvested. It will also be noted that after being blown down, the upper ends of the cane stalks tend to grow up straight and if these stalks are severed anywhere near the bend, the two portions may be conveniently treated in my apparatus, as before described.

In Figs. 14 to 17, inclusive, I have shown an arrangement especially adapted to take care of long crooked cane, in which the stalks are severed and the lower riper portions are fed to the mill after being stripped and cleaned, as hereinbefore described, while the upper portions are not only stripped and cleaned as hereinbefore described, but also topped, and the green portions separated from the riper portions, and all of this is effected by simply feeding the stalks as a whole to the apparatus, where the separation, cleaning, etc. are performed.

In these Figs. 14 to 17, the apparatus acts on the upper ends of the stalks precisely in the manner already described with reference to the single stalks, but in order to separate the stalks initially into two pieces, I provide a platform T, over which move the two conveyors U and U', having slats $u$ and $u'$. Extending across these two slatted conveyors U and U' is a door $O^2$ with spring hinges O' similar to the construction already described with reference to the hinged door O. This door presses the cane down between the slats $u$ and $u'$ into engagement with the saw $N^3$, and the upper ends of the stalks carrying the tops are delivered to the conveyor C, the conveyor U' being shorter than the conveyor U. After being delivered to the conveyor C, the upper ends of the stalks are operated upon in the apparatus in the manner already described. The lower portions of the stalks so severed are delivered by the longer slatted conveyor U to the conveyor $C^x$; and such portions of the stalks, after being subjected to the brushing and beating action already described, fall on to the transverse conveyor M, which delivers the longer stalks to the car, cart or other conveyor for feeding to the crusher or mill. In other words, the lower portions of the original stalks are thus assembled with the longer cut-off portions of the upper portions of the stalks, while the short tops are cut off as before, and separately delivered as hereinbefore described. In other words, the apparatus is precisely similar to that already described, except that there are two conveyors, on which the cane stalks are treated, the portions of the stalk carried by one conveyor are topped, while the portions of the stalks carried by the other conveyor are not, and the stalks are automatically severed into two portions, before the topping operation, as just described.

With short stubby cane stalks the unripe portion is apt to be very much shorter than where the cane is tall, and of luxuriant growth, or not ripe; and this difference is more or less between two fields on the same plantation; and the apparatus can be very readily adjusted to cut short lengths off the tops of short cane stalks, or longer lengths off the tops of longer cane stalks, by simply raising or lowering the shelf K, and setting it the proper distance below the saw $N^2$. This may be quickly done, when desired, so that in general the proper length of top may be severed from the main body of the stalk, before this main body is fed to the mill.

Where the eyes of the cane stalks have been killed, as by frost, the tops of the stalks are apt to turn sour, and in such cases, the stalks should be "topped" lower down; and such topping may be effected by lowering the shelf K to the proper position, which might be considerably lower than the normal position of the shelf when ripe unfrozen cane was being "topped."

This raising or lowering the shelf K would effect the same purpose whether the form of apparatus shown in Figs. 1 to 13, or that shown in Figs. 14 to 17, were employed.

While I have shown the invention in the preferred form, it will be obvious that various changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:

1. A machine for stripping and topping cane stalks, comprising a conveyor adapted to receive the stalks placed thereon longitudinally, an inclined chute, adapted to receive the cane stalks from said conveyor, conveyors moving transversely of said chute, a rotary saw projecting through said chute between said conveyors for severing the tops from the main body of the stalks, and means for holding the stalks against said saw.

2. A machine for stripping and topping cane stalks, comprising a conveyor adapted to receive the stalks placed thereon longitudinally, an inclined chute, adapted to receive the cane stalks from said conveyor, conveyors moving transversely of said chute, a rotary saw projecting through said chute between said conveyors for severing the tops from the main body of the stalks, and means for holdnig the stalks against said saw, with mechanical means for separating the tops from the main body of said stalks.

3. A machine for stripping and topping cane stalks, comprising an upwardly inclined conveyor adapted to receive the stalks placed thereon longitudinally, means for stripping the leaves and adhering solid matter from the stalks, an inclined chute, adapted to receive the stripped cane stalks from said conveyor, conveyors moving transversely of said chute, a rotary saw projecting through said chute between said conveyors for severing the tops from the main body of the stalks, and means for holding the stalks against said saw.

4. A machine for stripping and topping cane stalks, comprising an upwardly inclined conveyor adapted to receive the stalks placed thereon longitudinally, means for stripping the leaves and adhering solid matter from the stalks, an inclined chute, adapted to receive the stripped cane stalks from said conveyor, a vertically adjustable shelf adapted to engage the tops of the stripped stalks, conveyors moving transversely of said chute, a rotary saw projecting through said chute between said conveyors for severing the tops from the main body of the stalks, and means for holding the stalks against said saw.

5. A machine for stripping and topping cane stalks, comprising an upwardly inclined conveyor adapted to receive the stalks placed thereon longitudinally, means for stripping the leaves and adhering solid matter from the stalks, an inclined chute, adapted to receive the stripped cane stalks from said conveyor, conveyors moving transversely of said chute, a rotary saw projecting through said chute between said conveyors for severing the tops from the main body of the stalks, and means for holding the stalks against said saw, with mechanical means for removing the tops separately from the main body of said stalks.

6. A machine for stripping and topping cane stalks, comprising an upwardly inclined conveyor adapted to receive the stalks placed thereon longitudinally, means for stripping the leaves and adhering solid matter from the stalks, an inclined chute, adapted to receive the stripped cane stalks from said conveyor, a vertically adjustable shelf adapted to engage the tops of the stripped stalks, conveyors moving transversely of said chute, a rotary saw projecting through said chute between said conveyors for severing the tops from the main body of the stalks, and means for holding the stalks against said saw, with mechanical means for removing the tops separately from the main body of said stalks.

7. A machine for stripping and topping cane stalks, comprising two upper conveyors of unequal length adapted to receive the cane stalks transversely thereon, with means located between said conveyors for severing the stalks into two segments while carried by said conveyors, two lower conveyors adapted to respectively receive the stalk segments in a longitudinal direction from the upper conveyors, means for stripping the stalks of green leaves, trash and other solid matter, and means for topping the stripped stalks.

8. A machine for stripping and topping cane stalks, comprising two upper conveyors of unequal length adapted to receive the cane stalks transversely thereon, with means located between said conveyors for severing the stalks into two segments while carried by said conveyors, two lower conveyors adapted to respectively receive the stalk segments in a longitudinal direction from the upper conveyors, yielding gripping means near the end of each of said lower conveyors for gripping said stalks, means for stripping the stalks of green leaves, trash and other solid matter when so gripped, and means for topping the stripped stalks.

9. A machine for stripping and topping cane stalks, comprising two upper conveyors of unequal length adapted to receive the cane stalks transversely thereon, with means located between said conveyors for severing the stalks into two segments while carried by said conveyors, two lower conveyors adapted to respectively receive the stalk segments in a longitudinal direction from the upper conveyors, yielding gripping means near the end of each of said lower conveyors for gripping said stalks, means for stripping the stalks of green leaves, trash and other solid matter when so gripped, an inclined chute, adapted to receive the cane stalks, an adjustable shelf projecting from said chute to engage the tops of the stripped stalks, conveyors moving transversely of said chute, a rotary saw projecting through said chute between said last mentioned conveyors for severing the tops from the main body of the stalks, means for holding the stalks carried by said last mentioned conveyors against said saw, and means for separately delivering the main body of said stalks as severed by said saw and the shorter portions or tops of said stalks.

10. A machine for stripping and topping cane stalks, comprising two upper conveyors of unequal length adapted to receive the cane stalks transversely thereon, with means located between said conveyors for severing the stalks into two segments while carried by said conveyors, two lower conveyors adapted to respectively receive the stalk segments in a longitudinal direction from the upper conveyors, means for stripping the stalks of green leaves, trash and other solid matter, an inclined chute, adapted to receive the stripped cane stalks, an adjustable shelf projecting from said chute to engage the tops of the stripped stalks, a pair of conveyors moving transversely of said chute, a rotary saw projecting through said chute between said last mentioned conveyors for severing the tops from the main body of the stalks, means for holding said stalks carried by said last mentioned conveyors against said saw, and means for separately delivering the main body of said stalks as severed by said saw and the shorter portions or tops of said stalks.

11. A machine for stripping and topping cane stalks, comprising two upper conveyors of unequal length adapted to receive the cane stalks transversely thereon, with means located between said conveyors for severing the stalks into two segments while carried by said conveyors, two lower conveyors adapted to respectively receive the stalk segments in a longitudinal direction from the upper conveyors, yielding gripping means near the end of each of said lower conveyors for gripping said stalks, means for stripping the stalks of green leaves, trash and other solid matter when so gripped, an inclined chute, adapted to receive the cane stalks, an adjustable shelf projecting from said chute to engage the tops of the stripped stalks, conveyors moving transversely of said chute, a rotary saw projecting through said chute between said last mentioned conveyors for severing the tops from the main body of the stalks, means for holding the stalks carried by said last mentioned conveyors against said saw, and means for separately delivering the main body of said stalks as severed by said saw and the shorter portions or tops of said stalks.

12. A machine for stripping and topping cane stalks, comprising an upwardly inclined conveyor adapted to receive the stalks placed thereon longitudinally, yielding gripping means near the upper end of said conveyor for gripping said stalks, means for stripping the stalks of green leaves, trash and other solid matter while held in said gripping means, an inclined chute extending downwardly from said stripping means, adapted to receive the cane stalks, conveyors moving transversely of said chute, and means for severing the tops from the main body of the stalks.

13. A machine for stripping and topping cane stalks, comprising an upwardly inclined conveyor adapted to receive the stalks placed thereon longitudinally, yielding gripping means near the end of said conveyor for gripping said stalks, a rotary brush located near the end of said conveyor for stripping the stalks of green leaves, trash and other solid matter, a rotary beater provided with a plurality of thongs adapted to strike and clean said stalks of solid material adhering thereto, an inclined chute, adapted to receive the cane stalks from said beater, with means for severing the tops from the main body of the stalks, while on said chute.

14. A machine for stripping and topping cane stalks, comprising a conveyor adapted to receive the stalks placed thereon longitudinally, yielding gripping means at the end of said conveyor for gripping said stalks, a rotary brush located near the end of said conveyor for stripping the stalks of green leaves, trash and other solid matter, a rotary beater provided with a plurality of thongs adapted to strike and clean said stalks of solid material adhering thereto, and means for severing the tops in the stalks from the main body thereof.

15. A machine for stripping and topping cane stalks, comprising a conveyor adapted to receive the stalks placed thereon longitudinally, yielding gripping means at the end of said conveyor for gripping said stalks, a rotary brush located near the end of said conveyor for stripping the stalks of green leaves, trash and other solid matter, a rotary beater provided with a plurality of thongs adapted to strike and clean said stalks of solid material adhering thereto, and means for severing the tops in the stalks from the main body thereof, with means for separately distributing the severed tops of the body portions of the stalks.

16. A machine for stripping and topping cane stalks, comprising a conveyor adapted to receive the stalks placed thereon longitudinally, yielding gripping means at the end of said conveyor for gripping said stalks, a rotary brush located near the end of said conveyor for stripping the stalks of green leaves, trash and other solid matter, a rotary beater provided with a plurality of thongs adapted to strike and clean said stalks of solid material adhering thereto, feed rollers for drawing said stalks past said beater, an inclined chute, adapted to receive the cane stalks from said feed rollers, means for severing the tops from the main body of the stalks while on said chute, and means for separately delivering the main body of said severed stalks and the shorter portions or tops of said stalks.

17. A machine for stripping and topping cane stalks, comprising an upwardly inclined conveyor adapted to receive the stalks placed thereon longitudinally, a shorter conveyor mounted above the first mentioned conveyor for gripping said stalks, a rotary brush located near the end of said conveyor for stripping the stalks of green leaves, trash and other solid matter, an inclined chute, adapted to receive the stripped cane stalks, conveyors moving transversely of said chute, a rotary saw projecting through said chute between said conveyors, means for holding the stripped stalks on said chute, and means for severing the tops from the main body of the stalks while held on said chute.

18. A machine for stripping and topping cane stalks, comprising an upwardly inclined conveyor adapted to receive the stalks placed thereon longitudinally, yielding gripping means near the end of said conveyor for gripping said stalks, a rotary brush located near the end of said conveyor for stripping the stalks of green leaves, trash and other solid matter, a rotary beater provided with a plurality of thongs adapted to strike and clean said stalks of solid material adhering thereto, feed rollers for drawing said stalks past said beater, an inclined chute, adapted to receive the stripped cane stalks from said feed rollers, means for holding the stalks on said chute, means for severing the tops from the main body of the stalks while held on said chute, and means for separately delivering the main body of said stalks as severed by said saw and the shorter portions or tops of said stalks.

19. A machine for stripping and topping cane stalks, comprising an upwardly inclined conveyor adapted to receive the stalks placed thereon longitudinally, means for stripping the stalks of green leaves, trash and other solid matter while on said conveyor, an inclined chute, adapted to receive the cane stalks from the upper end of said conveyor, conveyors provided with transverse slats moving transversely of said chute, a rotary saw projecting through said chute between said last mentioned conveyors for severing the tops from the main body of the stalks, means for holding said stalks carried by said conveyors against said saw, and means for separately delivering the main body of said stalks as severed by said saw and the shorter portions or tops of said stalks.

20. A machine for stripping and topping cane stalks, comprising two upper conveyors of unequal length adapted to receive the cane stalks transversely thereon, with means located between said conveyors for severing the stalks into two segments while carried by said conveyors, two lower conveyors moving at right angles to the first conveyors and adapted to respectively receive the stalk segments in a longitudinal direction from the upper conveyors, means for stripping the stalks of green leaves, trash and other solid matter while carried by said lower conveyors, and means for severing the tops from the stripped stalks.

21. A machine for stripping and topping cane stalks, comprising two upper conveyors of unequal length adapted to receive the cane stalks transversely thereon, with means located between said conveyors for severing the stalks into two segments while carried by said conveyors, two lower conveyors moving at right angles to the first conveyors and adapted to respectively receive the stalk segments in a longitudinal direction from the upper conveyors, means for stripping the stalks of green leaves, trash and other solid matter while carried by said lower conveyors, and means for severing the tops from the stripped stalks with means for separating said severed tops from the other severed portions of the stalks.

JOSEPH THOMAS LANDAICHE.